US009265374B2

(12) United States Patent
Rasschaert

(10) Patent No.: US 9,265,374 B2
(45) Date of Patent: Feb. 23, 2016

(54) TRUNK MOUNTED CHRISTMAS TREE WATER LEVEL MEASURING AND ALARM DEVICE

(76) Inventor: Marc Rasschaert, Pittsburgh, PA (US)

( * ) Notice: Subject to any disclaimer, the term of this patent is extended or adjusted under 35 U.S.C. 154(b) by 862 days.

(21) Appl. No.: 13/039,429

(22) Filed: Mar. 3, 2011

(65) Prior Publication Data

US 2011/0214345 A1 Sep. 8, 2011

Related U.S. Application Data

(60) Provisional application No. 61/310,010, filed on Mar. 3, 2010.

(51) Int. Cl.
A47G 33/12 (2006.01)
G08B 21/00 (2006.01)

(52) U.S. Cl.
CPC ............. *A47G 33/12* (2013.01); *G08B 21/00* (2013.01)

(58) Field of Classification Search
CPC ........... A47G 33/12; A47G 2033/1286; A47G 2033/129; G08B 21/00
USPC ................ 47/32.5, 79, 82, 39, 40.5, 48.5, 42
IPC ..... A47G 33/12, 2033/1286, 2033/1293; G08B 21/00
See application file for complete search history.

(56) References Cited

U.S. PATENT DOCUMENTS

| 4,653,224 | A | 3/1987 | Weckesser |
| 4,796,017 | A | 1/1989 | Merenda |
| 4,825,587 | A | 5/1989 | Stancil |
| 4,850,137 | A | 7/1989 | Foster |
| 4,930,252 | A | 6/1990 | Krause et al. |
| 4,993,176 | A | 2/1991 | Spinosa |
| 5,054,236 | A | 10/1991 | Sands |
| 5,076,009 | A | 12/1991 | Cibor |
| 5,157,868 | A | 10/1992 | Munoz |
| 5,349,997 | A | 9/1994 | Rial |
| 5,363,591 | A | 11/1994 | Jones |
| 5,369,910 | A | 12/1994 | Copenhaver |
| 5,410,839 | A | 5/1995 | Granger |
| 5,428,348 | A | 6/1995 | Gault |
| 5,446,993 | A * | 9/1995 | Cullen ........................ 47/48.5 |
| 5,493,277 | A * | 2/1996 | Pierce et al. .................. 340/620 |
| 5,615,516 | A | 4/1997 | Brown |
| 5,625,345 | A * | 4/1997 | Stark ..................... A47G 33/12 340/521 |
| 5,661,926 | A | 9/1997 | Granger |
| 5,791,083 | A | 8/1998 | Giangrossi |
| 5,799,437 | A | 9/1998 | Evans et al. |
| 5,867,929 | A | 2/1999 | Jung et al. |

(Continued)

Primary Examiner — Lisa Tsang
(74) Attorney, Agent, or Firm — Blynn L. Shideler; Krisanne Shideler; BLK Law Group

(57) ABSTRACT

A trunk mounted Christmas tree water level measuring and alarm device includes a housing configured to be mounted to the tree trunk of a Christmas tree through at least one variable length attaching strap. A first water level sensor rod extends down from the housing and configured to extend into a water reservoir of a tree stand supporting the Christmas tree at a low water level. Another sensor rod may extend to a high water level. The housing including a power supply and at least one water level alarm configured to activate when the sensor rod(s) indicate a water level in the water reservoir below the low water level or, optionally, above the high water level. The housing further includes a light sensor and an alarm override wherein the alarm is overridden when the light sensor indicates the presence of less than a preset threshold of light around the housing.

1 Claim, 6 Drawing Sheets

(56) References Cited

U.S. PATENT DOCUMENTS

| | | |
|---|---|---|
| 5,894,695 A | 4/1999 | Stellatos |
| 6,073,390 A | 6/2000 | Baudier |
| 6,082,043 A | 7/2000 | Andrews |
| 6,088,960 A * | 7/2000 | Hartzog .......................... 47/65.5 |
| 6,167,651 B1 | 1/2001 | Luddy |
| 6,367,195 B1 | 4/2002 | Heyworth |
| D465,388 S | 11/2002 | Rhea |
| D483,234 S | 12/2003 | Hansen |
| 6,662,493 B1 | 12/2003 | Bathey |
| 7,201,333 B2 * | 4/2007 | Yoshikawa et al. ............ 239/565 |
| 2006/0213121 A1* | 9/2006 | Mercado et al. ................ 47/40.5 |
| 2009/0320363 A1* | 12/2009 | Matlen ............................... 47/65 |

* cited by examiner

TRUNK MOUNTED CHRISTMAS TREE WATER LEVEL MEASURING AND ALARM DEVICE

RELATED APPLICATION

The present application claims the benefit of U.S. Provisional Patent Application Ser. No. 61/310,010, filed Mar. 3, 2010, entitled "Trunk Mounted Christmas Tree water level Measuring and Alarm Device."

BACKGROUND OF THE INVENTION

1. Field of the Invention

The present invention relates to Christmas tree watering, and more particularly to a trunk mounted Christmas tree water level measuring and alarm device and an optional tree watering system.

2. Background Information

It is well known that watering cut plants, especially Christmas trees can be inconvenient. A Christmas tree is also called a "holiday tree" or a "Winter Celebration Tree" to use an allegedly more expansive, politically correct nomenclature. However, as the applicant is not yet legally obligated to use such silly terms these will be referenced as Christmas trees herein. When a Christmas tree is not adequately watered it will dry out and this can lead to an unsightly premature excessive loss of tree needles. The drying of the tree also creates a substantial safety hazard as a dry tree becomes a substantial fire hazard. This fire hazard can be exacerbated by electrical ornaments and open flames (candles and fires in a fireplace) that are on or in proximity to the Christmas tree.

Typically the cut Christmas tree is mounted within a tree stand that includes a container, tank, or reservoir for holding water so that the tree can remain fresh without prematurely drying out during the holiday season. Periodic attempts to water the tree require that water be carefully poured into the container. The water reservoir is usually obstructed by closely spaced tree limbs, holiday decorations, tree base wraps, and surrounding gifts. The watering of a typical Christmas tree is thus more difficult than typical house plants and cut flowers, and is therefore often postponed, leading to a lack of adequate water supply for the Christmas tree.

Additionally due to the difficulty in reaching the Christmas tree stand, the watering procedure can result, more often than with watering of other house plants, in water spillage due to over-filling. This over-filling often results in damage to surrounding objects (including gifts) and to the carpet and floor. This may occur because a person can not readily ascertain, due to the previously mentioned obstructions, when the container or water reservoir is filled to an appropriate level sufficient to allow the tree to receive water from the reservoir or filled to overflowing.

The prior art has provided a number of devices in attempts to overcome some of the mentioned shortcomings. For example, U.S. Pat. No. 4,796,017 discloses a low water alarm for a Christmas tree stand having a fluid sensing wire probe connected to a battery operated circuit that activates an alarm with lights and sound using a hook for hanging it on a Christmas tree to detect a low water level in the Christmas tree stand reservoir. U.S. Pat. No. 4,850,137 discloses a limb mounted tree watering funnel for a Christmas tree. U.S. Pat. No. 4,993,176 discloses an ornamental reservoir and tube watering device that operates on the principal of pressure differentials. U.S. Pat. No. 5,054,236 discloses a reservoir, a conduit, and a valve with a check ball. U.S. Pat. Nos. 5,076,009 and 5,799,437 disclose a Christmas tree watering system using a funnel placed in the head of a Santa Claus ornament and a tube plus a water level float valve control. U.S. Pat. No. 5,349,997 discloses a device having a segmented rigid conduit in combination with a funnel for adding water to hard-to-reach watering stands for indoor trees. U.S. Pat. No. 5,410,839 discloses a Christmas tree watering funnel with an indicating light and float. U.S. Pat. No. 5,428,348 discloses a device similar to U.S. Pat. No. 4,796,017. U.S. Pat. No. 5,661,926 discloses an offset funnel tree watering device. U.S. Pat. No. 5,791,083 discloses a trunk mounted tree watering device. U.S. Pat. No. 5,867,929 discloses a Christmas tree watering device that is coupled to the stand. U.S. Pat. No. 5,894,695 discloses a Christmas tree watering device with a funnel mounted from a horizontally extending section of tubing. U.S. Design Pat. Nos. D465,388, D483,234 disclose Christmas tree watering devices (generally funnels) in the shape of a Christmas tree ornament. U.S. Pat. Nos. 5,615,516, 6,073,390 and 6,082,043 6,167,651 disclose a watering system for a Christmas tree whereby an ornament is used as the receiving receptacle for liquid to be delivered to a base holder or container supporting the base of a Christmas tree for supplying water to the Christmas tree. U.S. Pat. No. 6,367,195 discloses a Christmas tree watering device that provides a filling reservoir separate from the tree. U.S. Pat. No. 6,662,493 discloses a tree watering device with internal float mechanism. Reservoir plant and Christmas tree watering systems are also shown in U.S. Pat. Nos. 5,369,910; 5,363,591; 5,157,868 4,930,252; 4,653,224; and 4,825,587.

The above patents tend to solve the problem of simplifying the watering procedure; however this is only part of the problem. There remains a need to tell the user when to use the watering device to water the tree. Christmas trees use considerably more water than the conventional house plant so there is a need to water more frequently. Several of the above solutions incorporate water level measuring devices with the watering devices. These devices can be of great assistance in maintaining a Christmas tree, however the above solutions are complex and thus costly. The complexity of these prior art water level measuring devices and/or the associated costs have lead to a failure of such device from being widely commercially implemented. Another problem of the prior art water level alarms for Christmas trees relates to notification of the user. If they are very unobtrusive notifications then the user is not adequately notified. Alternatively when the alarm is substantial they can be annoying and thus de-activated by the user, and equally ineffective in practice. As a result of all of these issues there is no widely available, simple, cost effective water level measuring device that allows users to properly maintain their Christmas trees.

All of the above identified patents are incorporated herein by reference. As described above, there remains a need in the art to for tree water level measuring and alarm device that can be easily and securely mounted and adapted to many trees and tree supports that will adequately indicate the user of the need to water the Christmas tree.

SUMMARY OF THE INVENTION

Some of the above objects are achieved with a trunk mounted Christmas tree water level measuring and alarm device according to the present invention. A trunk mounted Christmas tree water level measuring and alarm device according to the invention includes a housing configured to be mounted to the tree trunk of a Christmas tree through at least one variable length attaching strap. At least two sensor rods extending down from the housing and configured to extend into a water reservoir of a tree stand supporting the Christmas tree defining at least a low water level for the reservoir. The phrase "low water level" in referencing the tree stand water reservoir within this application is a level of water in the tree stand at which the tree can no longer, or is about to no longer, be able to draw water from the reservoir. A further sensor rod may be provided defining a high water level within the reservoir. The phrase "high water level" in referencing the tree stand water reservoir within this application is a level of water in the stand somewhere below the top of the reservoir at which the filling of the reservoir should be stopped. The housing includes a power supply and at least one water level alarm configured to activate at least when the sensor rods indicate that the water level in the water reservoir is below the low water level and, optionally, above the high water level. The housing further includes a light sensor and an alarm override wherein the alarm is overridden when the light sensor indicates the presence of less than a preset threshold of light around the housing.

An optional aspect of the present invention is the inclusion of a watering system. One tree watering system for use with the present invention includes a universal, easy access, decorative, trunk mounted Christmas tree watering device that comprises a trunk mounting base configured to be coupled to the trunk of a Christmas tree at a desired vertical height; a trunk attachment members securely attaching the base to the trunk of the tree; a funnel support arm adjustably coupled to the base in a telescoping fashion; a support arm locking member to secure the funnel support arm in a desired position; a funnel supported on the funnel support arm; and flexible tubing coupled to the funnel and extending through the funnel support arm and the trunk mounting base and adapted to extend to the water holding container of the Christmas tree stand. A decorative bird's nest may be provided to surround the funnel and provide an ornamental appearance to the watering device.

The term "universal" within the meaning of this application, when referencing the tree watering device, defines that the watering device can be attached to the tree within a range of vertical heights and the watering device may have the input mechanism positioned within a range of horizontal positions.

The phrase "easy access" within the meaning of this application, when referencing the tree watering device, defines that input mechanism, or funnel, of the watering device can be positioned horizontally spaced from the trunk of the tree closer to the outer perimeter of the tree.

The term "decorative" within the meaning of this application, when referencing the tree watering device, defines that the viewable portions of the watering device are in the form of conventional tree decorations, such as a bird's nest.

The phrase "trunk mounted" within the meaning of this application, when referencing the tree watering device or the water level measuring and alarm device, defines that the associated device can be attached and supported directly onto the trunk of the tree.

These and other advantages of the present invention will be clarified in the description of the preferred embodiments taken together with the attached drawings in which like reference numerals represent like elements throughout.

DESCRIPTION OF THE PREFERRED EMBODIMENTS

The present invention is for a cut tree, namely a Christmas tree 10 that will have a trunk 12 supported in a stand 14 which will also define a container or water reservoir 16 for holding water for the tree. As noted above, when a Christmas tree 10 is not adequately watered it can dry out and lead to an unsightly excessive loss of tree needles. The drying of the tree 10 also creates a safety hazard as a dry tree 10 becomes a fire hazard. A schematic representation of a tree 10 is shown in FIG. 1.

Figure 1:
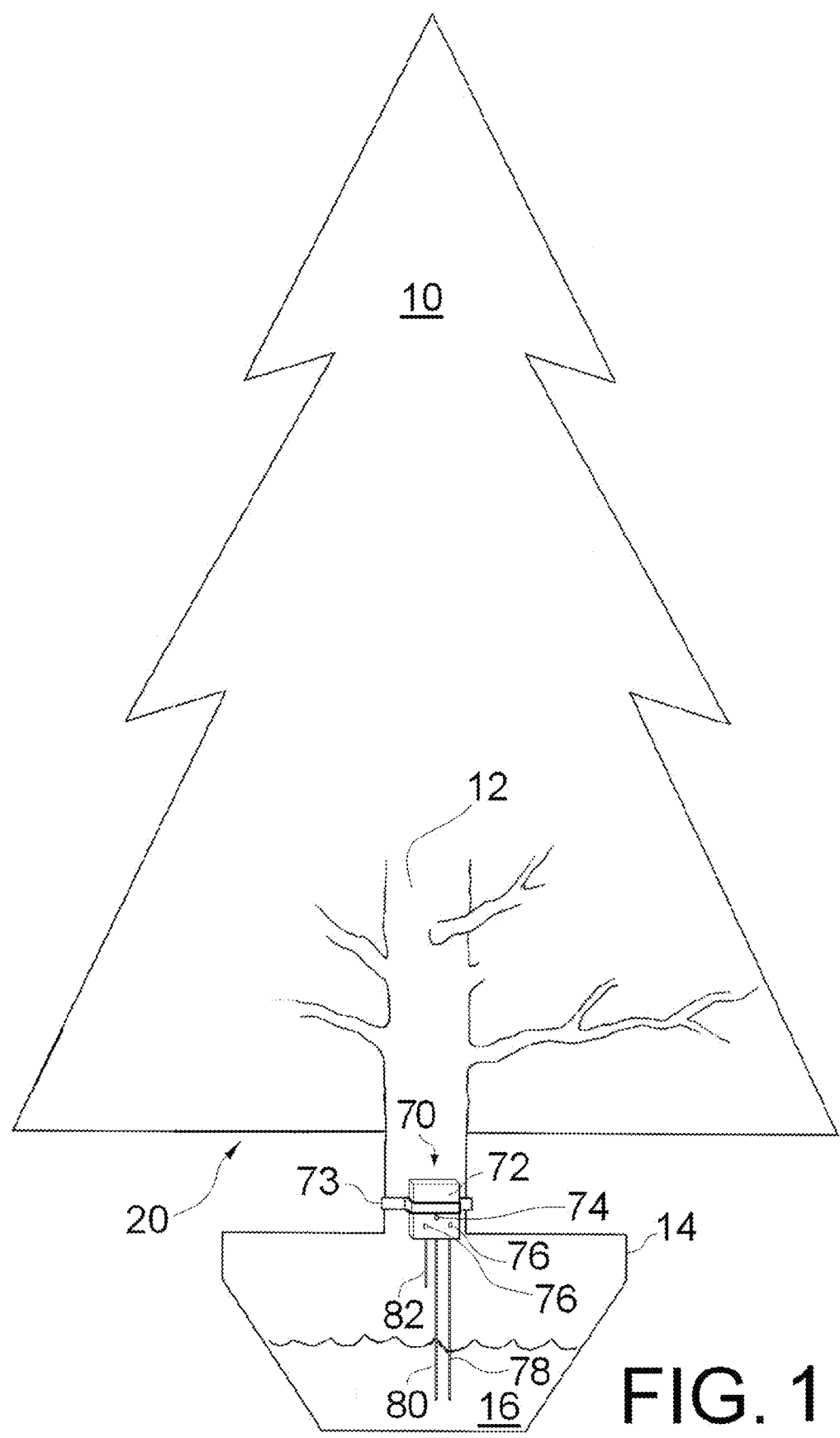
FIG. 1 is a schematic view of a trunk mounted Christmas tree water level measuring and alarm device according to one aspect of the present invention.
Figure 2:
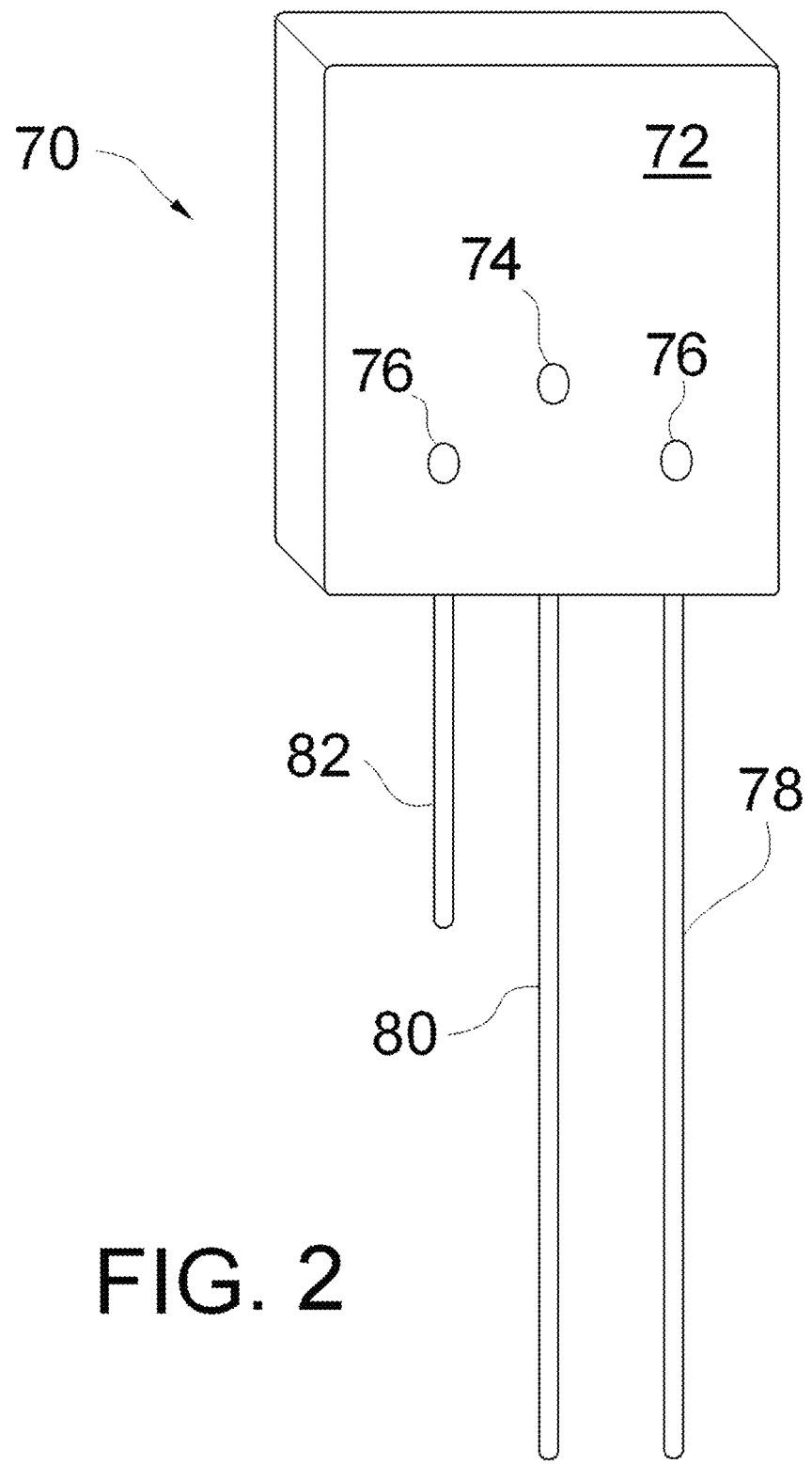
FIG. 2 is a schematic perspective view of the trunk mounted Christmas tree water level measuring and alarm device of FIG. 1.
Figure 3:
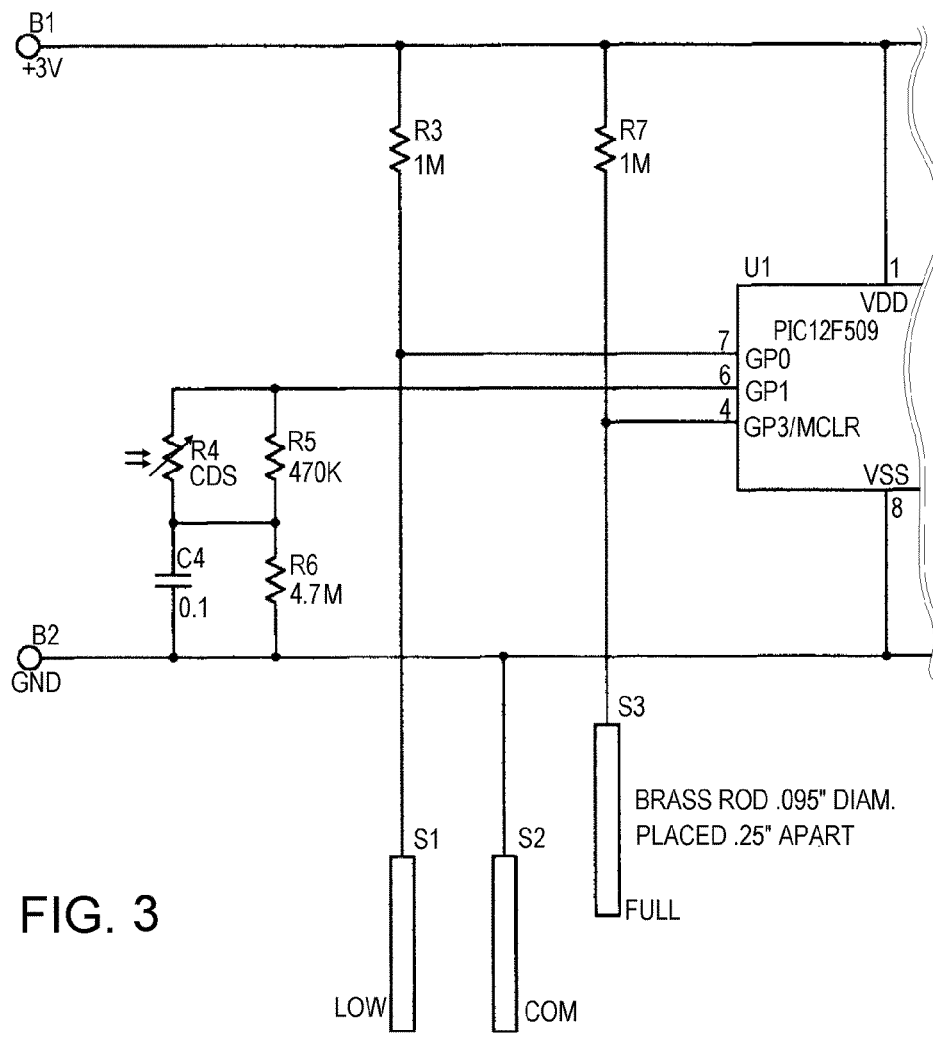
FIG. 3 is a schematic circuit diagram of the trunk mounted Christmas tree water level measuring and alarm device of figure.
Figure 3:
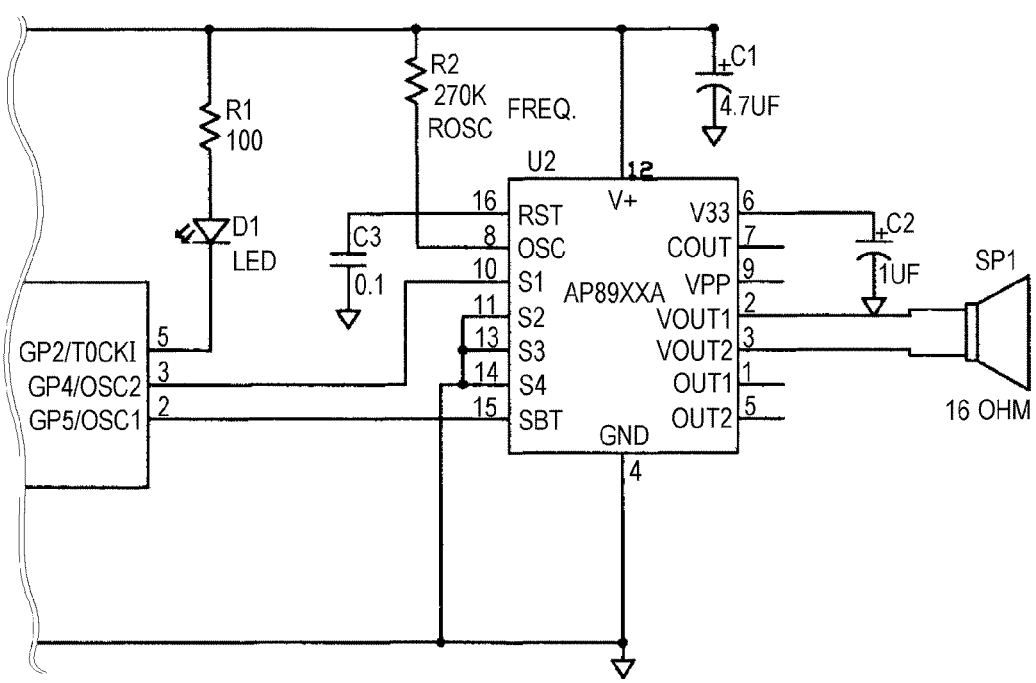
Figure 4:
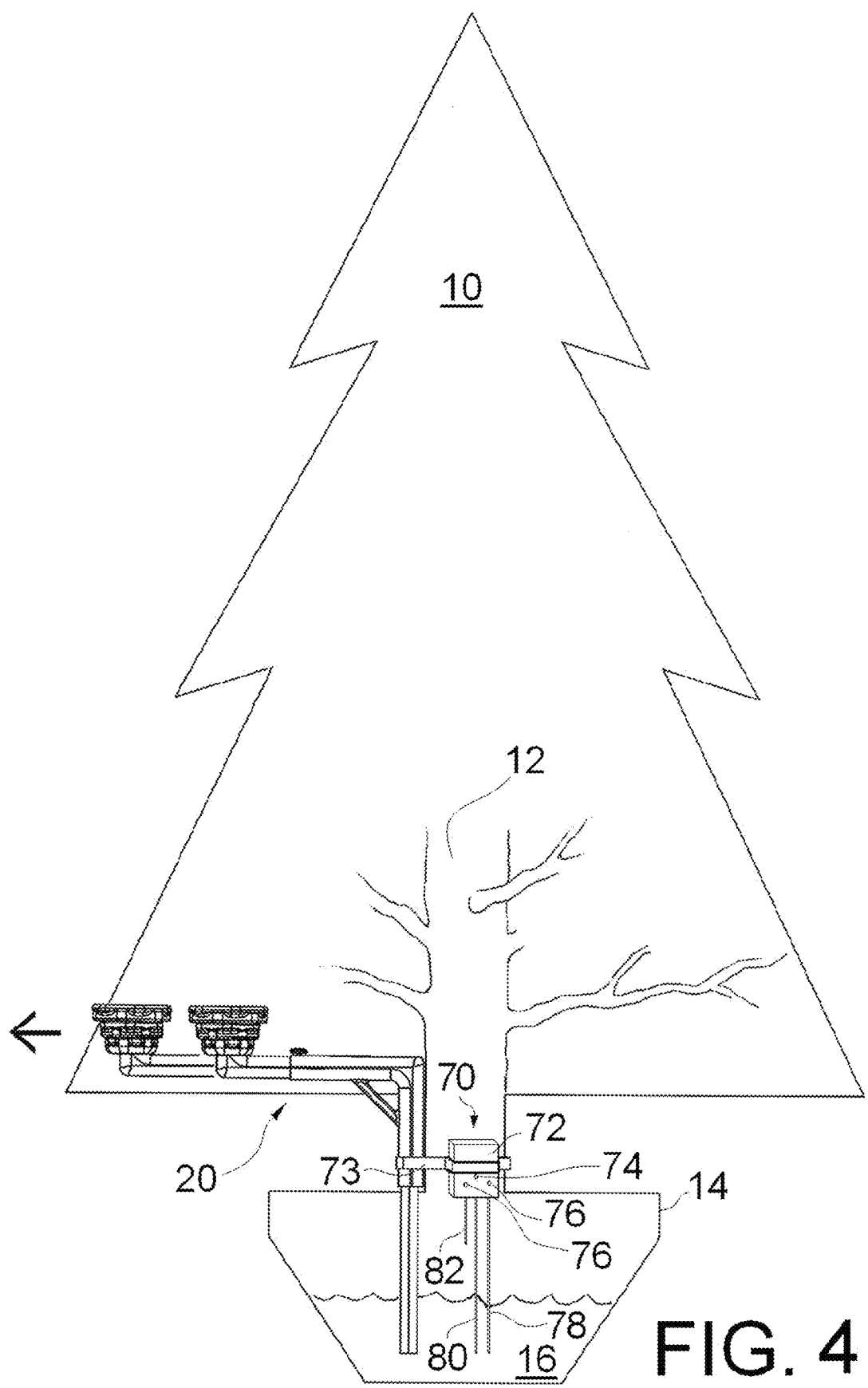
FIG. 4 is a schematic view of a trunk mounted Christmas tree water level measuring and alarm device of FIG. 1 coupled with a universal, easy access, decorative, trunk mounted tree watering device on a tree, with the funnel of the device illustrated in two operative positions, in accordance with one aspect of the present invention.

The present invention provides a trunk mounted Christmas tree water level measuring and alarm device 70 best shown in FIGS. 1-3. The trunk mounted Christmas tree water level measuring device and alarm device 70 according to the invention includes a housing 72 configured to be mounted to the tree trunk of a Christmas tree through at least one variable length attaching strap 73 as shown in FIGS. 1 and 4. The housing 72 is most economically a plastic housing, but any suitably durable material is sufficient. The housing includes a light sensor 74 and indicator lights 76 discussed below.

The housing 72 will includes slots or openings (not shown) for one or more of the attaching straps 73 to extend through. Straps 73 are variable length to accommodate a variety of tree trunk circumferences. Suitable construction of the straps 73 can include hook and loop type fastener (e.g., VECRO® brand fasteners) containing straps, straps with locking buckles, cable ties (also known as zip ties), or wire twist ties. Hook and loop type fastener (e.g., VECRO® brand fasteners) containing straps, straps with locking buckles, and wire twist ties have the advantage of being easily re-usable for multiple uses.

Other trunk attaching members could be considered such as trunk engaging clamps, trunk piecing members, or adhesives. However straps 73 seem to be more universal to a wider variety of trunks, and can be easily wrapped around intervening limbs, and more cost effective.

The device 70 includes a low water sensor formed of two sensor rods 78 (common connection) and 80 extending down from the housing 72 and configured to extend into a water reservoir 16 of a tree stand 14 supporting the Christmas tree 12. One rod 80 defines a low water level within the reservoir 16 while the other rod 78 is a common rod for the circuit or system as shown in FIG. 3 (see S1 and S2). The phrase "low water level" in referencing the tree stand water reservoir 16 within this application is a level of water in the tree stand 14 at which the tree 12 can no longer, or is about to no longer, be able to draw water from the reservoir 16. In actual application the low water level is set by the user when placing the device 70 and associated rods 78 and 80 into position. The rods 78 and 80 are designed to be used in most applications without significant changes, however the rods 78 and 80 can be bent around limbs and trimmed by the user, if needed to provide flexibility and ease of use.

A third rod 82 is provided in the device 70 and it extends to a defined high water level within the reservoir 16. The high level sensor rod 82 is designated as S3 in FIG. 3 and when combined with the common rod 78 forms a second high water level sensor. The phrase "high water level" in referencing the tree stand water reservoir 16 within this application is a level of water in the stand somewhere below the top of the reservoir 16 at which the filling of the reservoir 16 should be stopped. The high water level mark is actually defined by the location of the sensor rod 82 and this should be positioned sufficiently below the top of the reservoir 82 that once reached, and the associated high water level alarm (speaker 86 through circuitry 84) goes off the user will have a reasonable amount of time to react and stop filling without overflowing of the reservoir 16.

The present invention provides that the sensor rods 78, 80 and 82 can be very cost effectively formed as brass rods having 0.095" diameter. The advantage of the use of these brass sensor rods is that they are cost effective sensors and maintain the rigidity needed to stay at designated position. Further they are small enough to allow a user to trim these rods to change the associated level within their reservoir to adjust, as needed, the associated low and high level water designations for a particular stand 14. The brass rods can also be bent to provide for user adjustment of the defined levels and fine tuning of the associated alarm levels as the users deem appropriate. The present invention contemplates that no adjustment of the relative position of the rods will be needed for the majority of tree stand reservoirs 16.

The housing 72 includes a power supply, namely replaceable batteries 88. A pair of double A batteries provide sufficient power over a sufficient time to be effective. Further the Double A size does not increase the size of the housing 72 to an unreasonable level.

The device 70 includes at least one water level alarm 86 configured to activate when the sensors (78, 82 and 80) indicates that the water level in the water reservoir is below the low water level or, optionally, above the high water level where the high water level sensor rod 82 is used. The alarm 86 is preferably at least an audible alarm. The audible alarm can be in the form of a Christmas carol or other holiday tune in order to be less obtrusive. A simulation of Birds Chirping is also an unobtrusive but noticeable alarm for the alarm 86.

The control system (see schematic circuit 84) will, subject to the override described below, have the low level alarm be repeated until the water level sensed is above the low water level sensor rod 80, indicating the user has watered the tree. For example, the device 70 may have an appropriate Christmas Carol as the low level water alarm played and repeated every ten minutes until the until the water level sensed is above the low water level sensor rod 80. In contrast the high water level alarm, if used, need only be sounded once as it is only relevant while the user is adding water to the reservoir as an indication it is time to cease adding water. The high level water sensor will then reset when the water level goes below the high water level mark. Preferably the high water level alarm is distinguishable from the low water alarm. The high level alarm can merely be a beep or other single tone, as it is typically only relevant during the filling of the reservoir 16.

The system water level alarm or device water level alarm can also be in the form of a visible alarm such as a strobe or flashing light. The visual alarm could be in conjunction with the audible alarm 86. Where a visual alarm is also used, the visual alarm for low or high water level should be selected to be distinguishable from lights that conventionally adorn a Christmas tree. Thus a strobe light may be desirable. The strobe light for the low level water alarm may also be selected to go off periodically till the water level is attended to. For example the strobe may flash for 1 minute every ten minutes till the level is addressed. It is anticipated that the user could select to have the alarm be visual, audible or both for the device of the present invention with a selector switch on the side of the housing that is moved from OFF to i) ON-audible only, ii) ON-visual only or iii) ON (visual and audible). In the illustrated environment the indicator lights 76 form, in part, a visible alarm. One light 76 is green giving an indication of power to the device 70, while the other light 76 is red indicating that there is power to the device and one alarm condition is active (Low or High water level exceeded)

The housing further includes a light sensor 76 and an alarm override in the circuitry 84 wherein the alarm 86 is overridden when the light sensor indicates the presence of less than a preset threshold of light around the housing. This feature of the invention is intended to keep the alarm from inconveniently going off in the middle of the night. Without such feature the alarm could often go off at inconvenient times. This problem can lead the user to turn off the device at night, making the device far less practical and useful. The threshold for the light sensor is preferably met by daylight hours and is also preferably met by conventional tree lighting. Thus the alarm will only go off for low levels of water detected in the daytime or when there is sufficient lighting in the vicinity (e.g. conventional tree decorative lighting). Thus in operation, if the device sensor rods 78 and 80 identify a water level below the low water level in the middle of the night when the tree lights and associated lights have been turned off, the override will prevent the alarm from sounding. The override will be deactivated until the morning with daylight illumination or with the users turning on of the tree lights (e.g., the users come home in the evening and turn on the lights), following which the low level alarm will commence. Further it is possible for the low level alarm to be going off during the day and then be overridden at night if the tree lights were not on only to re-start the following morning or when the user's turn on the tree lighting. It is possible to design the override as adjustable to allow the users to set the amount of light that triggers the override.

As the high water level alarm only sounds once, there is less impact on the override system on the operation and effect of the high water level alarm. In theory such a high water level alarm override could come into play where the user is watering the tree in the dark. Consequently, preferably the override would not affect the high water level sensor, from a utility standpoint. As the watering the tree in the dark scenario is somewhat impractical, whether the high water level alarm is also overridden is more a function of the costs and simplicity of tying the override to the alarm generally thus overriding both the high water level and low water level alarms or specifically only to the low water level alarm. The costs will largely drive this implementation in practice.

It is anticipated that the housing 72 can have an override deactivation switch such that the user, if desired, can have the device always sound the designated low water level alarm and high water level alarm regardless of the light level. The default setting would be to include the override in the operable position, such that the alarm override is only deactivated by those choosing to do so.

The housing further includes a visible activation light 76 or LED member to indicate to the user that the power supply is operating and the system is on as noted above.

Figure 5:
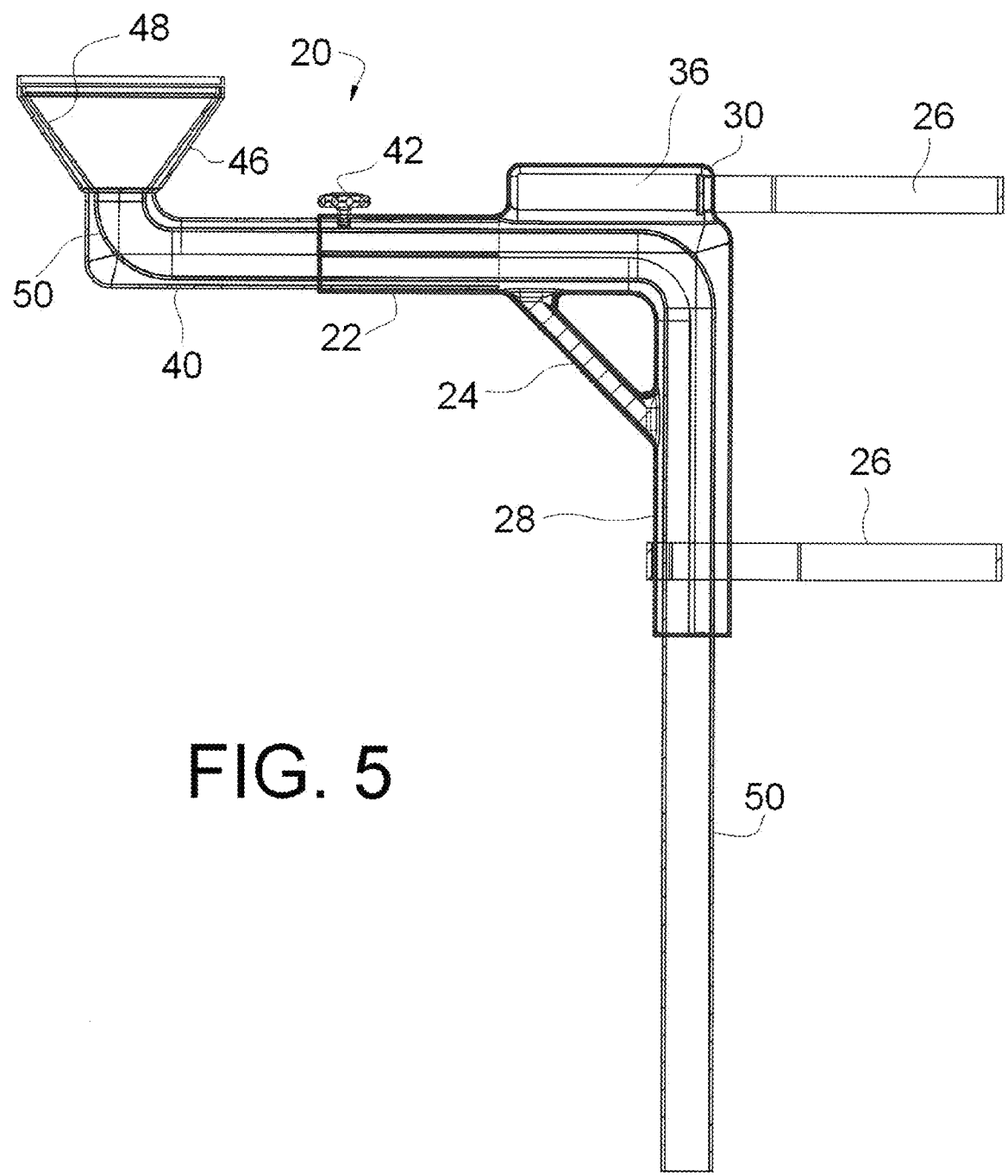
FIG. 5 is a schematic side section view of the tree watering device if figure 4.
Figure 6:
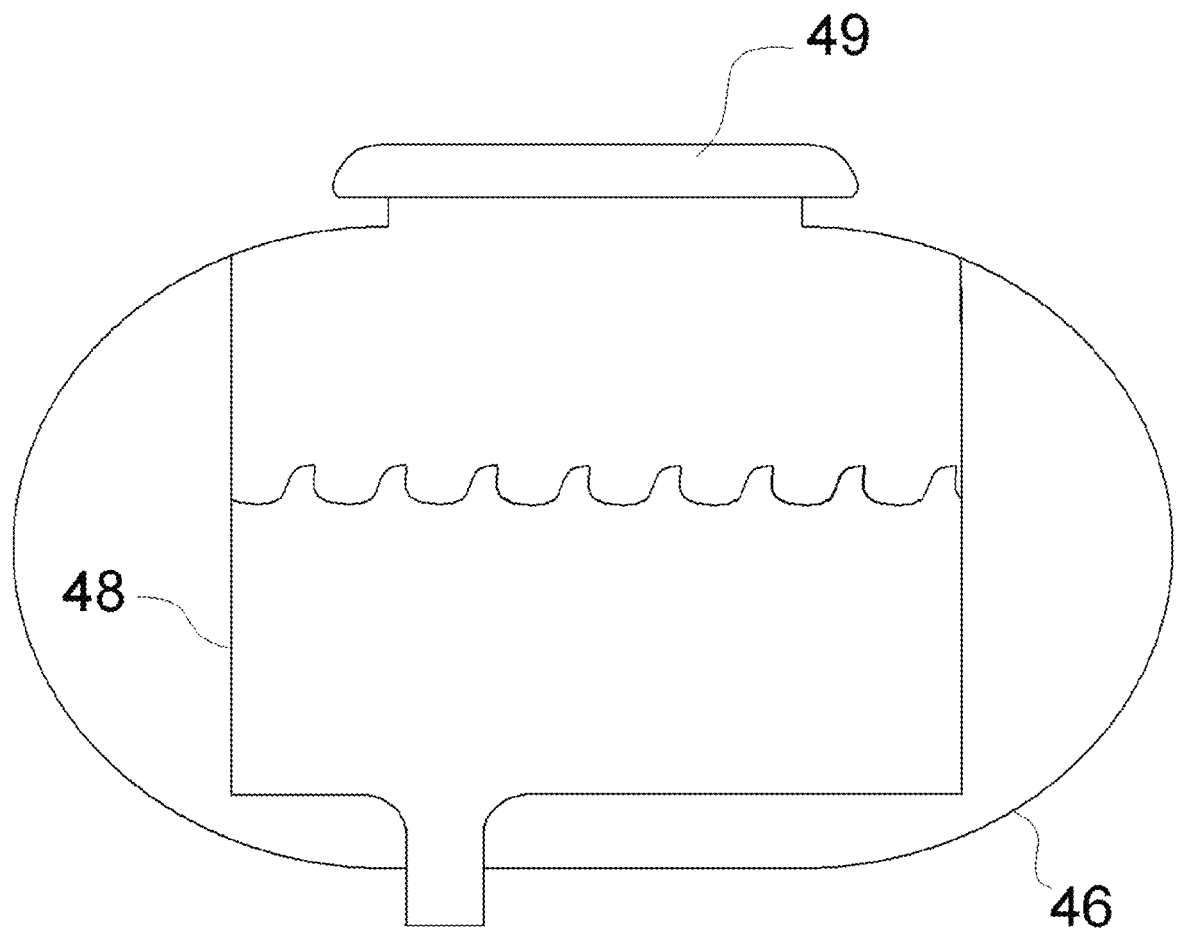
FIG. 6 is a schematic view of an alternative funnel design for a tree watering device according to another aspect of the present invention that can be used with the trunk mounted Christmas tree water level measuring and alarm device of the present invention.

The water level measuring and alarm device 70 of the present invention can be used with any conventional watering system to further assist the user. Any of the tree watering systems of the prior art can be utilized, although those having more complex water level measurement devices are redundant. A limb mounted funnel and flexible tubing as shown in FIG. 4 is likely the most cost effective tree watering system. FIG. 6 illustrates an alternative decorative funnel. FIGS. 4-5 illustrate a universal, easy access, decorative, trunk mounted Christmas tree watering device 20 that could also be used.

The Christmas tree watering device 20 includes a trunk mounting base 22 configured to be coupled to the trunk of the Christmas tree 10 at a desired vertical height as determined by the user. The trunk mounting base 22 is preferably a plastic molded member including a "vertical" trunk tube adapted to be adjacent the trunk 12 of the tree 10 and a "horizontal" support arm tube substantially perpendicular to the trunk tube. The trunk mounting base 22 further includes a support member 24 extending between the trunk tube and the support arm tube, whereby the base provides a rigid support member for the device 20.

The Christmas tree watering device 20 includes trunk attachment members in the form of a pair of attaching straps 26 securely attaching the base 22 to the trunk 12 of the tree 10. The attaching straps 26 may be formed as woven webs including hook and loop type fasteners for securing the straps 26 in place. Webbing straps with buckles can also be used. A wide variety of attaching member configurations can be used as discussed above with the housing of the water level measuring device.

One additional alternative for the attaching members is to have a tree mounting member that is secured to the tree by any convenient mechanism (it's own straps, spikes, bands, nails, etc) and have a rotational snap on coupling (i.e. a post and hole connection) between the base 22 and the tree mounting member (not shown). This further attaching mechanism requires a post or hole to be added to the base 22, but allows for rotational adjustment to be easily accomplished between the tree trunk 12 and the base 22. It is not shown in the embodiments of the figures, as it requires a further piece to be manufactured and adds to the cost of the overall device.

This market is believed to be particularly cost sensitive and the advantages of particular additional components needs to be weighed against the costs of adding additional components.

One of the attaching straps is positioned vertically below the support arm 40 (discussed below) along the trunk tube of the base 22 which provides a strap locating position 28. One of the attaching straps 26 is secured at a position vertically above the position of the support arm tube of the base 22 at strap location 30 in boss 36. This positioning of the straps 26 both above and below the support arm tube of the base 20 provides for secure support for the device 20.

The Christmas tree watering device 20 includes a funnel support arm 40 adjustably coupled to the base 22 in a telescoping fashion. The funnel support arm 40 is generally in the form of a plastic tube that engages in a sliding fashion the support arm tube of the base 22.

A support arm locking member 42 is provided that is threaded through a hole in the support arm of the base 22 and engages the funnel support arm 40. Tightening of the support arm locking member will secure the funnel support arm 40 in a desired position. The support arm 40 can include detents at selected locations to provide a secure locking engagement that prevents movement of the support arm 40 when the locking member is fully engaged. Other conventional locking members may be used, such as spring biased pins engaging detents, locking bands, locking cams, and other engagement mechanisms that are found in telescoping tubular members.

A funnel is supported on the funnel support arm 40. The funnel is comprises of an outer funnel member 46 attached to the funnel support arm 40 and an inner funnel member 48. Flexible tubing 50 is coupled to the inner funnel member 48 of the funnel. The tubing 50 extends through the funnel support arm 40 and through the tubular and support arm tube and the trunk tube of the trunk mounting base 22. The tubing 50 is adapted to extend to the water holding container 16 of the Christmas tree stand 14.

The Christmas tree watering device 20 may include a decorative Bird's nest configured to surround the funnel and provide an ornamental appearance to the watering device 22. The schematically illustrated bird's nest of FIG. 4 can take a variety of forms and can include simulated birds to add to the decorative effect. The Bird's nest is a preferred decoration as it fits with the Christmas tree décor and conforms to the funnel shape.

The tree watering device 20 is "universal" within the meaning of this application, because the base 22 can be attached to the trunk 12 of the tree 10 at any vertical height as desired by the user, within the general overall length as defined the original length of tubing 50. It is anticipated that a long length of tubing will be provided to the user who can trim excess tubing length to the desired length after attaching the base 22 at the desired vertical height. The funnel of the watering device may have the input mechanism, which is the funnel, positioned within a range of horizontal positions that are defined by the relative telescoped positions of the arm 40 and base 22.

The tree watering device 20 is an "easy access" unit within the meaning of this application, because, as described above, the input mechanism, or funnel, of the watering device 20 is generally positioned horizontally spaced from the trunk 12 of the tree 10 closer to the outer perimeter of the tree 12 making it easy to access by the user.

The Bird's nest 44 funnel cover of the present device 20 allows the device to be "decorative" within the meaning of this application as a bird's nest is a conventional tree decoration.

The watering device 20 is "trunk mounted" within the meaning of this application as the base 12 is to be attached and supported directly onto the trunk 12 of the tree 10 as noted above.

FIG. 6 illustrates an alternative funnel design that can be incorporated into the watering system of the present invention. In this embodiment the funnel is in the form of an ornament with a removable lid. The ornament can house both the funnel body and serve as housing for the battery, speaker and other electrical components if tied to the device described above.

It will be apparent to those of ordinary skill in the art that various modifications may be made to the present invention without departing from the spirit and scope thereof. The scope of the invention is not to be limited by the illustrative examples described above. The scope of the present invention is defined by the appended claims and equivalents thereto.

What is claimed is:

1. A Christmas tree water level measuring and alarm device comprising:
   a housing configured to be mounted to a Christmas tree;
   a power supply within the housing;
   an attaching mechanism for mounting the housing to the Christmas tree, wherein the attaching mechanism includes a pair of attaching straps configured to secure the housing to trunk of the Christmas tree;

at least one water level sensor extending down from the housing and configured to extend into a water reservoir of a tree stand supporting the Christmas tree and configured to define a low water level within the reservoir;

a water level alarm within the housing configured to activate at least when the one water level sensor indicates that the water level in the water reservoir is below the low water level;

a light sensor within the housing; and an alarm override within the housing, wherein the water level alarm is overridden and will not activate regardless of the water level in the reservoir when the light sensor indicates the presence of less than a preset threshold of light around the housing.

* * * * *